April 4, 1950 C. A. MAYNARD 2,502,628
PERMEAMETER
Filed Feb. 14, 1947 2 Sheets-Sheet 2
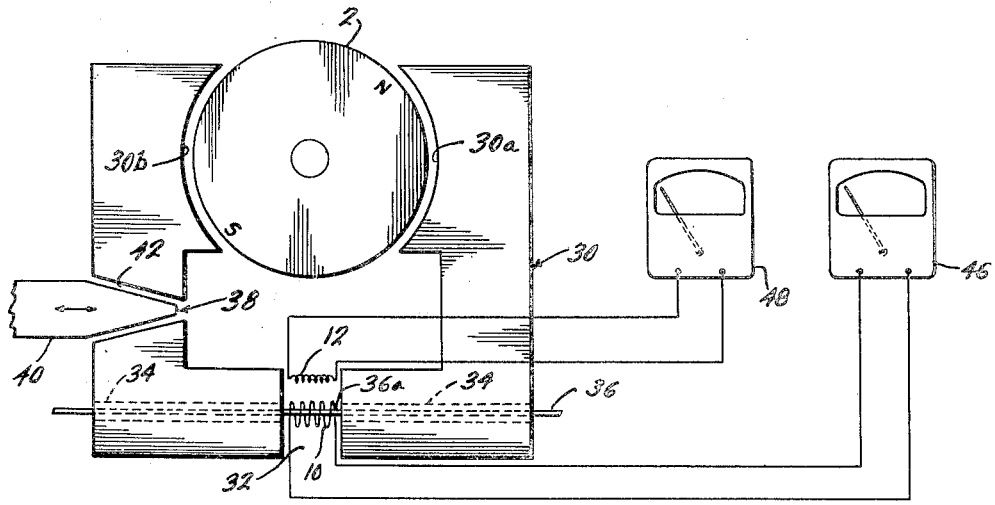
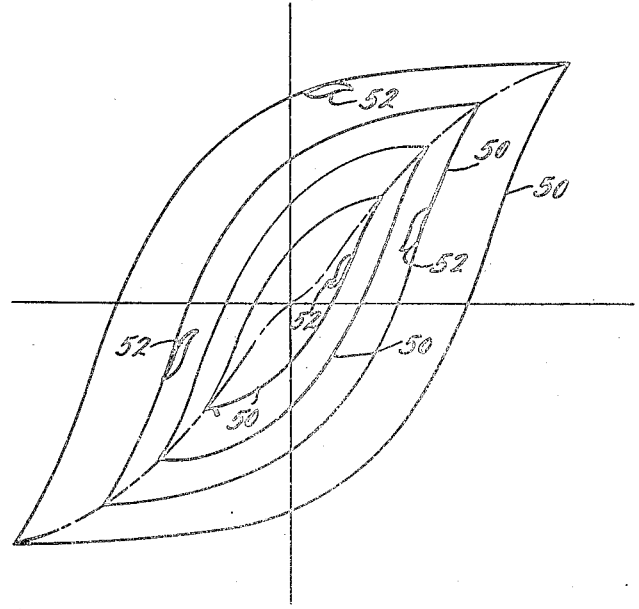
Inventor
CHARLES A. MAYNARD
by
Attys.

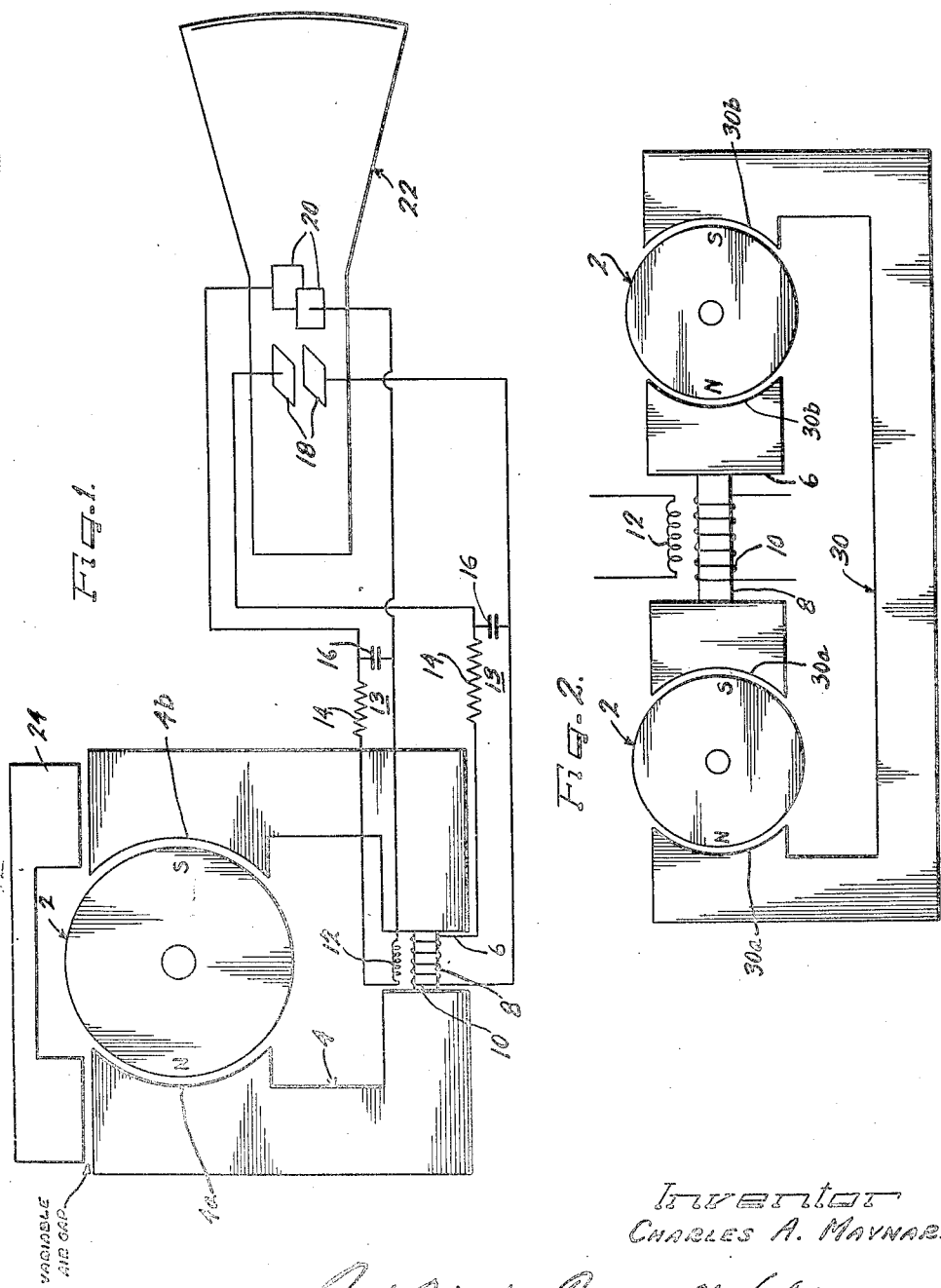

Patented Apr. 4, 1950

2,502,628

UNITED STATES PATENT OFFICE 2,502,628

PERMEAMETER

Charles A. Maynard, Valparaiso, Ind., assignor to The Indiana Steel Products Company, Valparaiso, Ind., a corporation of Indiana Application February 14, 1947, Serial No. 728,627

13 Claims. (Cl. 175—183)

This invention relates to a device for determining the magnetic properties of a test specimen and, in particular, for visually indicating the major and/or minor hysteresis loops of a test specimen under varying magnetic field conditions.

Devices of the class to which this invention relates have been heretofore known in the art and are commonly referred to as permeameters. Essentially such permeameters provide apparatus for subjecting a magnetic test specimen to the influence of a variable strength magnetic field and produce an electrical indication of the instantaneous values of applied field strength and the resulting flux density produced in the test specimen. In has heretofore been found convenient to apply the output indications of the field strength and flux density responsive means respectively to the deflecting plates of a cathode ray tube and thus produce on the screen of such tube a visual trace representing the relationship of flux density in the test specimen to applied field strength over the range of field strengths available in the apparatus.

In permeameters of known construction, some difficulty has been experienced in obtaining a cyclic variation of the magnetic field intensity applied to the test specimen which would be free from distortion and further would be of sufficiently low frequency to substantially eliminate any distortion caused by the generation of eddy currents in the specimen under test. Likewise, known permeameters have not permitted minor hysteresis loops between any two selected field strengths to be conveniently recorded or indicated.

Accordingly, it is an object of this invention to provide an improved magnetic testing device of the permeameter type.

A further object of this invention is to provide an improved permeameter which will permit the accurate recording or observation of major or minor hysteresis loops of a magnetic test specimen.

Another object of this invention is to provide an improved permeameter wherein the magnetic field excitation is cyclically variable at a very low frequency and is substantially free from distortion.

The specific nature of this invention as well as other objects and advantages thereof will become apparent to those skilled in the art from the following detailed description of the annexed sheet of drawings which, by way of preferred example only, illustrate one specific embodiment of the invention.

On the drawings:

Figure 1 is a schematic view of a permeameter incorporating this invention and shown in circuit relation with a cathode ray tube type indicator;

Figure 2 is a schematic view of a modified form of a permeameter;

Figure 3 is a schematic view of a preferred modification of this invention which permits any desired minor hysteresis loop to be recorded; and Figure 4 is a graph of major and minor hysteresis curves of a magnetic specimen obtainable by the apparatus of Figure 3.

As shown on the drawings:

In one form, this invention contemplates the utilization of a rotating permanent magnet to provide a cyclically varying magnetic excitation for the magnetic specimen being tested. Referring to Figure 1, a permanent magnet 2 is provided comprising a cylindrical mass of magnetic material of high retentivity which is suitably magnetized to provide diametrically opposed poles N and S. Magnet 2 is rotatably mounted with respect to a pair of pole faces 4a and 4b provided in spaced, diametrical relationship on a magnetic core structure 4. Obviously, the permanent magnet 2 might be replaced by an electro-magnet energized by any suitable source of current. However, the illustrated utilization of a permanent magnet is a particularly convenient adaptation, inasmuch as no external sources of power are required, and, further, there is no necessity for effecting electrical connections to a rotating member.

The core structure 4 is preferably formed from soft iron of low retentivity characteristics and is suitably shaped to define a magnetic loop circuit for the rotating flux produced by the rotating magnet 2. The pole face portions 4a and 4b of the core 4 are accurately shaped to snugly surround diametrically opposed portions of the rotating permanent magnet 2, and hence a substantially pure sinusoidal variation of flux density will be produced in the core structure when the permanent magnet 2 is rotated at a constant speed by any suitable source of power (not shown).

The core structure 4 includes a low permeability gap portion 6 which may conveniently comprise an air gap. Air gap 6 is suitably proportioned so as to snugly accommodate a test specimen 8 therein in bridging relation. A flux density responsive coil 10 is provided which surrounds the test specimen 8. A field strength responsive coil 12 is also provided in air gap 6, disposed therein in such manner as to be linked by a portion of the flux traversing the air gap. The coils 10 and 12 are respectively connected to integrating networks 13, indicated schematically by the resistor 14 and condenser 16, and the output of the respective integrating networks 13 are connected to the deflection plates 18 and 20 of a cathode ray tube 22.

It is therefore obvious that as the permanent magnet member 2 is rotated a voltage will be generated in the coil 10 which is proportional to the differential of the rate of change of flux through the test specimen 8 and hence a deflecting voltage will be applied to deflection plate 18 which is proportional to the instantaneous values of flux density existing in the test specimen 8. Since the permeability of the air gap 6 is unity, the integrated voltage output of the coil 12 will be proportional to the instantaneous values of field strength existing in the air gap 6, which, of course, is identical to the field strength across test specimen 8.

Accordingly, the beam of the cathode ray tube 22 will be deflected along a path which visually indicates the instantaneous relationship of flux density and field strength in the test specimen 8 over the range of field strengths produced by the rotating permanent magnet member 2. Hence, the cathode ray beam will in effect trace the hysteresis curve of the test specimen 8 between a range of positive and negative field strength excitation determined by the strength of permanent magnet member 2.

In the event that it is desired to obtain traces of the hysteresis curve for smaller extreme values of excitation, such may be conveniently obtained by incorporating a variable reluctance device in the magnetic loop, such as positioning a shunt 24 adjacent pole faces 4a and 4b to provide a variable air gap therebetween.

Figure 2 shows a modification of this invention which permits still higher values of extreme excitation to be obtained and has the advantage of producing an even more accurately sinusoidal variation of field strength. A pair of rotatable permanent magnet members 2 are provided and these rotatable members are driven in synchronism by a suitable source of mechanical power (not shown). A single core structure 30 is provided which provides a magnetic loop circuit through both of the rotating magnet members in series. Thus the core 30 includes pole faces 30a respectively cooperating in diametrical relationship with one of the permanent magnet members 2 and pole faces 30b cooperating in diametrical relationship with the other permanent magnet member 2. An air gap 6 is again provided in the core structure 30, and the test specimen 8, flux responsive coil 10 and field responsive coil 12 are mounted in air gap 6 in the same manner as heretofore described in connection with the modification of Figure 1. The coils 10 and 12 are connected through integrating circuits 13 to the cathode ray tube in the same manner as heretofore described.

In the modification of Figure 2, when the permanent magnet members are properly synchronized so that corresponding poles of the magnet members 2 will occupy identical angular positions with respect to the pole faces 30a and 30b, respectively, then the total magnetic field produced across the air gap 6 will have a maximum value substantially twice that produced by the single permanent magnet in the construction of Figure 1. Furthermore, it is found that the cyclical variations of the field strength produced by the rotating permanent magnet members has less distortion and is more nearly sinusoidal.

In both modifications of this invention, heretofore described, the permanent magnet member 2 may be conveniently rotated at a low speed and an extremely low rate variation in field intensity across the air gap obtained, hence substantially eliminating the generation of eddy currents in associated conducting parts of the apparatus and removing a substantial source of distortion which has produced much difficulty in permeameters of conventional construction.

Referring to Figure 3, there is shown a preferred modification of this invention which, while not limited thereto, is particularly adaptable for determining the magnetic properties of magnetic wire, such as the type utilized in magnetic recording devices. The modification of Figure 3 has the further advantage of not requiring a constant speed driving means for the magnetic rotor but will operate by manual rotation or shifting of such rotor. Furthermore, the apparatus shown in Figure 3 will permit any desired minor hysteresis loop to be obtained between any two selected values of field excitation lying within the range of maximum positive and negative excitations produced by the magnetic rotor.

A permanent magnet rotor 2 is again provided comprising a circular cross section mass of magnetic material of high retentivity which is suitably magnetized to provide diametrically opposed poles N and S. A core structure 30 is provided having opposed pole faces 30a and 30b disposed in spaced diametrical relationship with respect to magnetic rotor 2. The core structure 30 includes a low permeability gap portion 32 which may conveniently comprise an air gap as in the previously described modifications. A hollow passage 34 is provided in those portions of core structure 30 which are in alignment with both sides of the low permeability gap 32, and such passage permits a length of magnetic wire 36 which is to be tested to be inserted therein. Obviously that portion 36a of the wire 36 which lies in the low permeability gap 32 is subjected to the entire magnetic field strength existing across low permeability gap 32, and hence the flux in wire portion 36a will be a function of such field strength and the permeability of that portion of the wire.

To provide an additional control of field strengths applied across low permeability gap 32, a variable reluctance device 38 is incorporated in the magnetic circuit of the core structure 30. Such variable reluctance device 38 may constitute a shunt arrangement similar to the shunt 24 of the modifications of Figures 1 and 2 or, alternatively, may comprise a wedge-shaped core piece 40 which is adjustable in a correspondingly shaped gap 42 provided in core structure 30.

A field strength measuring coil 12 is again suitably mounted in the low permeability gap portion 32 so as to be threaded by the air gap flux, and a flux measuring coil 10 is provided surrounding the portion 36a of the wire 36 which is disposed in the gap 32. The coils 10 and 12 may be connected to a cathode ray type indicating meter in the same manner as heretofore described in connection with the modifications of Figures 1 and 2, but preferably are respectively connected to the terminals of a pair of flux meters 46 and 48, each of which may comprise a conventional ballistic galvanometer provided with suitable shunt resistance to yield an over-damped characteristic.

As will be apparent to those skilled in the art, the flux meters 46 and 48 will respectively provide an indication of the total change in flux linked by the coils 10 and 12 respectively. Furthermore, such indication will be independent of the speed of rotation of the magnetic rotor 2. In fact, it is preferable that the magnetic rotor 2 be manually rotated at a slow rate between any two angular positions, and the flux meters 46 and 48 will respectively accurately indicate the change in total flux linkages of the coils 10 and 12 between such two positions. The indication of the meter 48 which is connected to the air coil 12 is of course directly proportional to the field strength existing across the low permeability gap 32 by virtue of the unity permeability of the air gap.

The apparatus shown in Figure 3 will permit measurement and recording of any desired major or minor hysteresis loops for any particular specimen under test. Field strengths and flux density values for any major hysteresis loops may be accomplished by successive readings of the deflections of flux meters 46 and 48 corresponding respectively to successive angularly displaced positions of the rotor 2 throughout a 360° rotation. The extreme field excitation values for such major hysteresis loops, which are indicated at 50 in Figure 4, are determined by the position of the variable reluctance control device 38. If at any point on any one of the major hysteresis loops it is desired to record a minor hysteresis loop, indicated at 52 on Figure 4, such may be conveniently done by varying the position of reluctance control member 38 through a small cycle, producing a variation in field intensity across the low permeability gap 32 corresponding to the extremes of field strengths desired for the particular minor hysteresis loops.

The extreme versatility of a permeameter embodying this invention is therefore apparent. At the same time, the entire apparatus is of extremely simple and inexpensive construction and may be manually operated under field conditions without requiring the availability of special sources of voltage or constant speed driving mechanisms.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A permeameter comprising a magnet member mounted for rotation to generate a rotating magnetic field, a magnetic core cooperating with said rotatable magnet member to define a magnetic circuit loop including said rotatable magnet member and traversed by a varying magnitude component of said rotating field, said core having an air gap therein adapted to receive a test magnetic specimen in bridging relation, a first coil means adapted to cooperate with the test specimen to provide a first electrical effect proportional to flux density in the test specimen, and a second coil means disposed in said air gap to provide a second electrical effect proportional to the magnetic field strength across said air gap.

2. A permeameter comprising a cylindrical permanent magnet mounted for rotation about its natural axis and having diametrically opposed poles, thereby generating a rotating magnetic field, a magnetic core cooperating with said rotatable permanent magnet to define a magnetic circuit loop including a radial path through said rotatable permanent magnet, whereby the rotation of said permanent magnet produces cyclical variations of field strength in said magnetic circuit loop, said core having an air gap therein adapted to receive a test magnetic specimen in a bridging relation, a first coil means adapted to cooperate with the test specimen to provide a generated voltage proportional to the flux density of the test specimen, and a second coil means disposed within said air gap so as to generate a voltage proportional to the magnetic field strength across said air gap.

3. A permeameter comprising a cylindrical permanent magnet mounted for rotation about its axis at a substantially constant speed and having diametrically opposed poles, a generally U-shaped, magnetic core member having pole pieces on the ends of the arms thereof respectively disposed adjacent said rotatable permanent magnet in opposed diametrical relation to define a magnetic circuit loop including a diametrical path through said rotatable permanent magnet, whereby the rotation of said permanent magnet produces cyclical variations of field strength in said magnetic circuit loop, said core having an air gap in the base portion thereof adapted to receive a test magnetic specimen in bridging relation, a first coil means adapted to cooperate with said test specimen to provide a generated voltage proportional to the flux density in the test specimen, and a second coil means disposed in said air gap so as to generate a voltage proportional to the field strength in said air gap.

4. A permeameter comprising a magnet member mounted for rotation to generate a rotating magnetic field, a magnetic core having opposed pole faces cooperating with said rotatable magnet member to define a magnetic circuit loop including said rotatable magnet member and traversed by varying magnitude components of said rotating field, said core having an air gap therein adapted to receive a test magnetic specimen in bridging relation, a magnetic shunt member disposed adjacent said pole faces in bridging relation, said shunt member being shiftable relative to said core to reduce the maximum effective field strength across said air gap to a predetermined value, a first coil means adapted to cooperate with the test specimen to provide a generated voltage proportional to the flux density in the test specimen, and a second coil means disposed in said air gap so as to generate a voltage proportional to the field strength in said air gap.

5. A permeameter comprising a pair of magnet members mounted for synchronous rotation, whereby each generates a rotating magnetic field, a magnetic core structure cooperating with said rotatable magnet members to define a magnetic circuit loop including said rotatable magnet members in series circuit, aiding relationship, whereby the rotation of said magnet members will produce cyclical variations of magnetic field strength in said magnetic circuit loop, said core structure having an air gap therein remote from said rotating magnet members and adapted to receive a test magnetic specimen in bridging relation, a first coil means adapted to cooperate with the test specimen to provide a generated voltage proportional to the flux density in the test specimen, and a second coil means disposed in said air gap so as to generate a voltage proportional to the field strength in said air gap.

6. A permeameter comprising a pair of cylindrical, permanent magnets mounted for synchronous rotation and having diametrically disposed poles, thereby generating a pair of rotating magnetic fields, a magnetic core structure cooperating with said rotatable permanent magnets to define a magnetic circuit loop including said rotatable permanent magnet members in series circuit, aiding relationship, whereby the rotation of said permanent magnets produces a cyclical variation of field strength in the magnetic circuit loop, said core structure having an air gap therein adapted to receive a test magnetic specimen in bridging relation, a first coil means adapted to cooperate with the test specimen, and a second coil means disposed in said air gap so as to generate a voltage proportional to the field strength in said air gap.

7. A permeameter comprising a core structure defining a magnetic circuit loop, said core structure having an opening therein, a permanent magnet member shiftably mounted in said opening and arranged to produce a magnetic field in said loop variable as a function of the shiftable position of said permanent magnet, said core structure also having a known low permeability gap therein adapted to receive a test magnetic specimen in bridging relation, a first coil means adapted to cooperate with a test specimen to provide a first electrical effect proportional to flux density of the test specimen, and a second coil means disposed in said gap to provide a second electrical effect proportional to the field strength in said air gap.

8. A permeameter comprising a core structure defining a magnetic circuit loop, said core structure having an opening therein, a permanent magnet member shiftably mounted in said opening and arranged to produce a magnetic field in said loop variable as a function of the shiftable position of said permanent magnet, said core structure also having an air gap therein adapted to receive a test magnetic specimen in bridging relation, a first coil adapted to surround the test specimen, a first ballistic type flux meter connected to said first coil to indicate the total flux in the test specimen, a second coil disposed in said air gap, and a second ballistic type flux meter connected to said second coil to indicate the air gap flux, thereby indicating the magnetic field strength across said air gap.

9. A permeameter comprising a core structure defining a magnetic circuit loop, said core structure having an opening therein, a permanent magnet member shiftably mounted in said openings and arranged to produce a magnetic field in said loop variable as a function of the shiftable position of said permanent magnet, said core structure also having an air gap therein adapted to receive a test magnetic specimen in bridging relation, a first coil adapted to surround the test specimen, a first ballistic type flux meter connected to said first coil to indicate the total flux in the test specimen, a second coil disposed in said air gap, a second ballistic type flux meter connected to said second coil to indicate the air gap flux, thereby indicating the magnetic field strength across said air gap, and means for selectively varying the total magnetic reluctance of said loop, whereby any desired major or minor hysteresis loop may be indicated by said flux meter by combined operation of said last mentioned means and shifting of said permanent magnet member.

10. A permeameter comprising a cylindrical permanent magnet mounted for rotation about its natural axis and having diametrically opposed poles, a magnetic core structure cooperating with said rotatable permanent magnet to define a magnetic circuit loop including said rotatable permanent magnet, whereby rotation of said permanent magnet member varies the magnetic field strength in said loop, said core structure having an air gap therein and open ended passages respectively communicating with each side of said air gap, said passages being adapted to receive a magnetic wire specimen threaded therethrough to dispose a portion of such wire in bridging relation to said air gap, a first coil means adapted to cooperate with said bridging portion of the test wire to provide a first electrical effect proportional to the flux density in said bridging wire portion, and a second coil means disposed in said air gap to provide a second electrical effect proportional to the magnetic field strength across said air gap.

11. A permeameter comprising a cylindrical permanent magnet mounted for rotation about its natural axis and having diametrically opposed poles, a magnetic core structure cooperating with said rotatable permanent magnet to define a magnetic circuit loop including said rotatable permanent magnet, whereby rotation of said permanent magnet varies the magnetic field strength in said loop, said core structure having an air gap therein and open ended passages respectively communicating with each side of said air gap, said passages being adapted to receive a test magnetic wire specimen threaded therethrough to dispose a portion of such wire in bridging relation to said air gap, a first coil adapted to surround the bridging portion of the test wire, a first ballistic type flux meter connected to said first coil to indicate the total flux in said bridging portion of the test wire, a second coil disposed in said air gap, and a second ballistic type flux meter connected to said second coil to indicate the air gap flux, thereby indicating the magnetic field strength across said air gap.

12. A permeameter comprising a cylindrical permanent magnet mounted for rotation about its natural axis and having diametrically opposed poles, a magnetic core structure cooperating with said rotatable permanent magnet to define a magnetic circuit loop including said rotatable permanent magnet, whereby rotation of said permanent magnet varies the magnetic field strength in said loop, said core structure having an air gap therein and open ended passages respectively communicating with each side of said air gap, said passages being adapted to receive a magnetic wire specimen threaded therethrough to dispose a portion of such wire in bridging relation to said air gap, a first coil adapted to surround the bridging portion of the test wire, a first ballistic type flux meter connected to said first coil to indicate the total flux in the bridging portion of the test wire, a second coil disposed in said air gap, a second ballistic type flux meter connected to said second coil to indicate the air gap flux, thereby indicating the magnetic field strength across said air gap, and means for selectively varying the total reluctance of said magnetic circuit loop, whereby any desired major or minor hysteresis loops may be indicated by said flux meters by combined operation of said last mentioned means and rotation of said permanent magnet member.

13. A permeameter comprising a magnetic core structure defining a magnetic circuit loop, said core structure having at least a pair of spaced, opposed pole face portions, means rotatable between said pole face portions for generating a cyclically varying, magnetic flux traversing said magnetic circuit loop, said core having a low permeability gap therein adapted to receive a test magnetic specimen in bridging relation, a first coil means adapted to cooperate with the test specimen to provide a first electrical effect proportional to flux density in the test specimen, and a second coil means disposed in said air gap to provide a second electrical effect proportional to the magnetic field strength across said air gap.

CHARLES A. MAYNARD.

REFERENCES CITED

The following references are of record in the file of this patent:

UNITED STATES PATENTS

| Number | Name | Date |
|---|---|---|
| 1,511,595 | Fahy | Oct. 14, 1924 |
| 1,855,849 | Babbit | Apr. 26, 1932 |
| 1,992,100 | Stein | Feb. 19, 1935 |
| 2,097,947 | Fahy | Nov. 2, 1937 |